Feb. 2, 1954   S. ROBSON   2,668,046
CONDENSATION OF ZINC FROM ITS VAPOR IN GASEOUS MIXTURES
Original Filed June 18, 1947   3 Sheets-Sheet 1
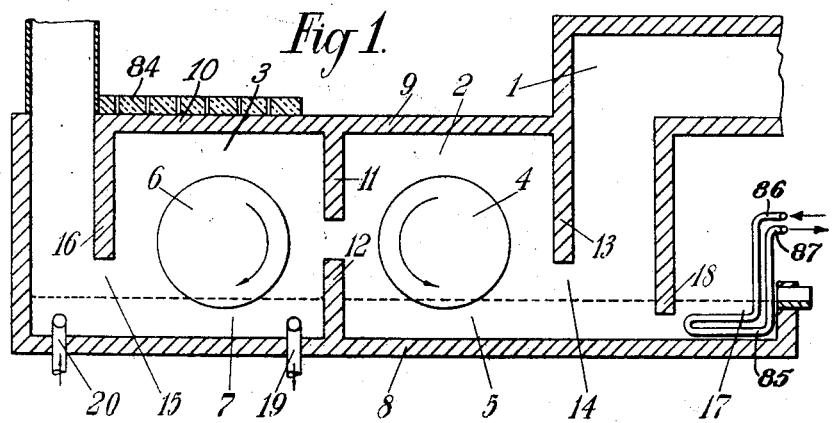
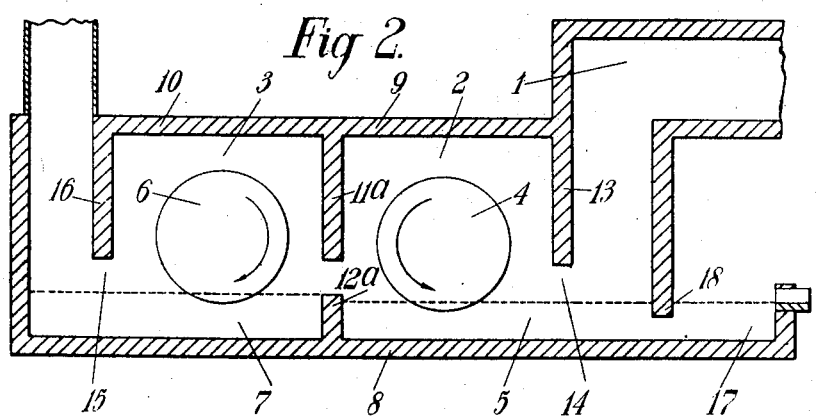
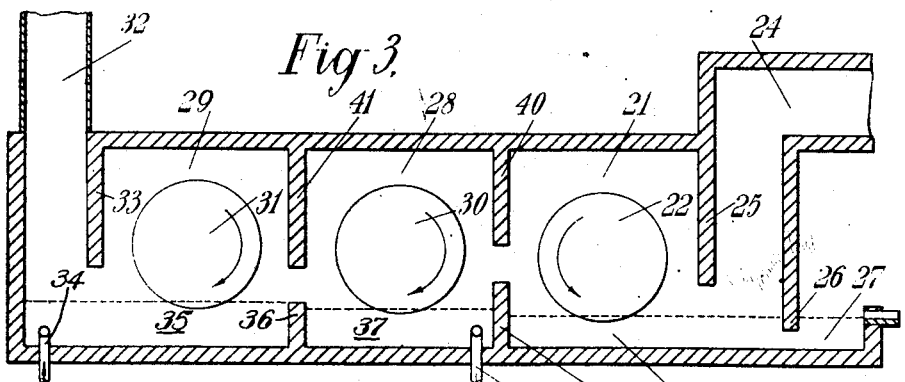
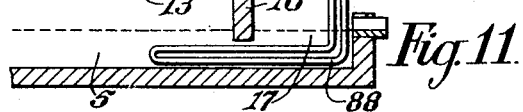

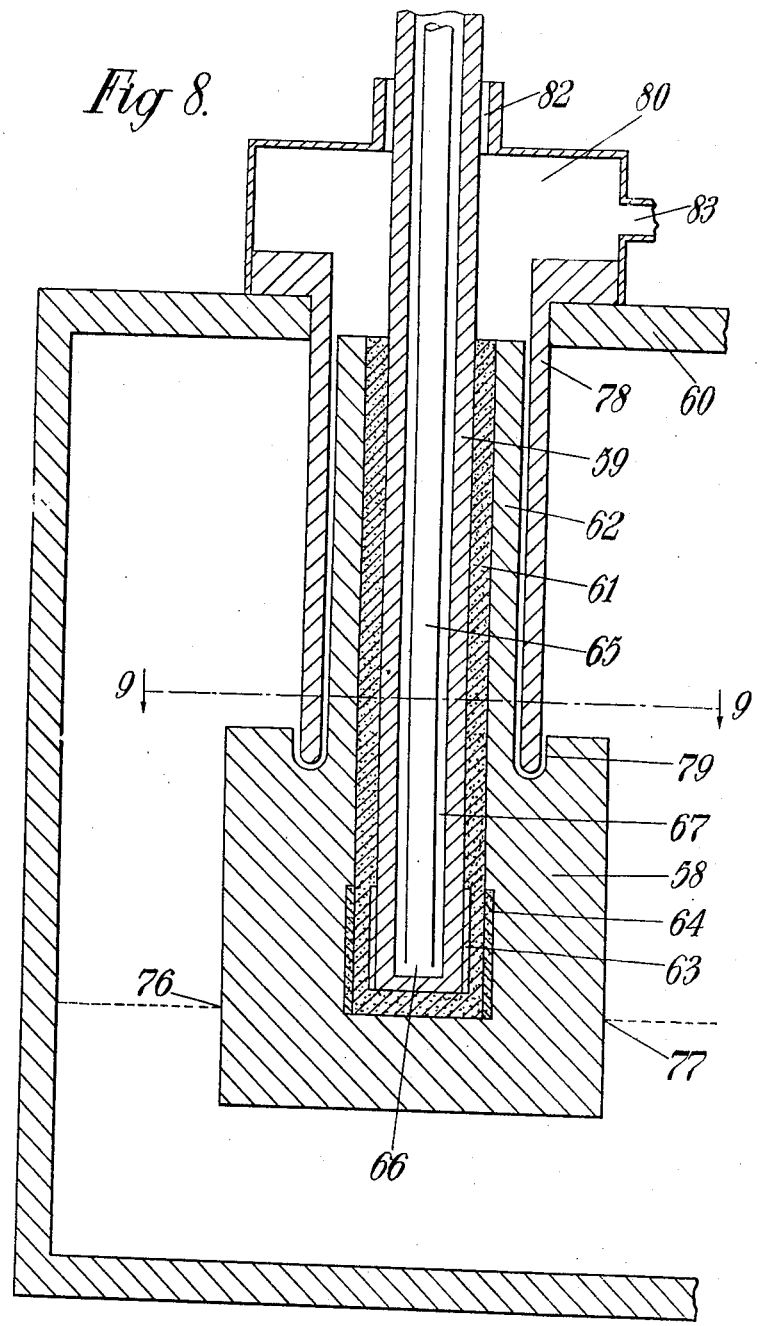

Patented Feb. 2, 1954

2,668,046

UNITED STATES PATENT OFFICE 2,668,046

CONDENSATION OF ZINC FROM ITS VAPOR IN GASEOUS MIXTURES

Stanley Robson, Enfield, England, assignor to The National Smelting Company Limited, London, England Original application June 18, 1947, Serial No. 755,443. Divided and this application May 6, 1949, Serial No. 91,656. In Great Britain March 12, 1946

Section 1, Public Law 690, August 8, 1946
Patent expires March 12, 1966

2 Claims. (Cl. 266—15)

This invention relates to apparatus for condensing zinc from zinc-vapour-bearing gases.

More especially our improved apparatus is intended for carrying out the condensation process described and claimed in United States Patent No. 2,473,304, from which this application has been divided, but the apparatus is in general capable of wider application to condensing processes using a shower of molten metal as the condensing medium and performing the condensation in two or more stages. For zinc-condensation the condensing medium may be molten zinc or molten lead, or both may be used.

An object of the invention is an improved arrangement of successive condensing chambers each containing mechanical means of a rotary nature for showering molten metal.

Another object is an arrangement of connecting passages between two such chambers and the inlets and outlets for zinc-vapour-bearing gases and molten metal respectively, such that the vapour-bearing gases are compelled to pass through the showers of molten metal produced by the rotary showering means, and the molten metal flows from one chamber to the other in counter-current with the gases.

A further object of the invention is a novel form of rotary device for showering molten metal in a condensing chamber.

Our improved apparatus comprises a stationary condensing unit, partitioned to provide two or three internal chambers, each of which contains mechanical means for producing a continuous shower or spray of the liquid metal. The unit also comprises an inlet for the gases into the first of the chambers and a stack outlet from the last chamber, and the chambers communicate with one another above the levels of the molten metal in them.

The spray or shower of molten metal through which the gases are caused to pass may be produced by a number of devices. One method is to cause a rotary paddle-wheel to dip into a pool of the molten metal. Within compartments of the condenser in which liquid zinc is present all portions of the paddle-wheel and its shaft are constructed of, or encased in, a material, such as graphite or silicon carbide, that is not attacked by zinc at the temperature at which the condenser works. The paddle wheels are enclosed in a box having at one end an opening for the admission of the zinc vapour and gases and at the other end an outlet for the gases out of which zinc has been condensed. The box is made of a steel casing, the lid of which is removable, and is lined throughout with bricks or a cement that is not attacked by liquid zinc or lead. One or two similarly lined partitions separate the chambers in which successive condensation stages are effected and each partition has an opening to allow the gases to pass from one chamber to the next.

The gas inlet and outlet openings of each chamber should be so located with reference to the paddle-wheels that the gases are compelled to traverse the shower or spray of molten metal, the final exhaust stack being at the top of the last chamber at the end remote from that at which the gases enter. The paddle-wheel should have only a small axial clearance at each end from the sides of the chamber, to ensure that the shower or spray of molten metal extends across the full width of the chamber. The outlet for liquid metal from each chamber should be situated at a level ensuring adequate immersion of the paddle-wheel for showering the molten metal at all times. The liquid metal outlet above referred to is either a tap hole or a weir separating two adjacent condensing chambers both containing the same liquid metal as condensing agent, as when both stages of condensation are performed by molten zinc or in a three-stage process with the first stage using a shower of molten zinc and the second and third stages using showers of molten lead, as hereinafter described. Control of heat loss from the chambers may be obtained by placing heat insulating bricks round them as required, or by cooling the base of the chambers by means of water jackets or pipes.

The mechanical condensing apparatus should be situated as close as possible to the outlet by which the gases leave the furnace, to ensure that the zinc-bearing gases are brought into contact with the shower or spray of molten metal as soon as possible after leaving the furnace and without appreciable loss of temperature. Rapid chilling is thereby effected, heat being abstracted from the gases at a high rate by the shower of molten metal; appreciable oxidation of zinc by carbon dioxide is substantially avoided, and blue powder is not formed to any great extent.

If the condensation is effected by a shower or spray of liquid zinc in both stages, the compartment into which the gas enters first has a taphole or other means for withdrawing the molten metal; the heat insulation round this compartment is so controlled that the metal leaves the tap-hole at a suitable temperature. It is impracticable to tap metal at a temperature only just above its melting point, and it is generally considered convenient to have zinc leave the condenser at a temperature of at least 500° C. In the other condensing chamber, where the stack for the exhaust gases is situated the heat insulation may be so adjusted that the temperature is only slightly above the melting point of zinc; as zinc is condensed in this compartment, it forms a pool there, and then flows over a weir into the other condensing chamber.

With a condenser using a mechanically produced shower or spray of liquid metal the temperature of the gases can be reduced very nearly to that of the liquid metal. The vapour pressure of zinc is such that if the gas entering the condenser contains only about 5% zinc, and the gases leaving the condenser are saturated with zinc at somewhat over 500° C., an appreciable fraction of the zinc is lost. By using two condenser chambers, with liquid and gas flowing in counter-current, the zinc vapour can be condensed till the gas leaving the second chamber is saturated with zinc vapour at a temperature not greatly in excess of 420° C., while the metal can still be tapped off at above 500° C.

In the modified form of the invention above referred to, in which a shower of molten lead is used in the second stage of condensation, the compartment, in which the first stage of condensation is effected by a shower of molten zinc, is isolated from the second stage compartment except for the gas transfer opening, so as to avoid mixing of the zinc and lead baths of the first and second stages. Otherwise the apparatus is similar to that described above. The heat insulation of the first stage condenser compartment is preferably so adjusted that all the molten zinc is maintained at about the minimum satisfactory tapping temperature, say from 500° to 550° C.; whereas the temperature of the molten lead in the second condensation stage may be considerably lower, e. g. about 420° C.

The method of condensing zinc from a mixture of its vapour with permanent gases by bringing the gases directly from the producing unit into a stationary chamber in which a shower or spray of molten lead is maintained by mechanical means such as a rotary paddle-wheel is described in United States Patent No. 2,464,262. In this process the temperature of the lead is normally between 500° C. and 550° C. and a very large quantity of lead must be employed on account of the low solubility of zinc in lead, which decreases as the temperature is lowered; with cyclic operation, in which the lead is re-circulated after cooling to enable dissolved zinc to be separated, the rate of circulation of lead must usually be from 100 to 200 times the rate of extraction of zinc by weight. In the two-stage process herein mentioned, in which the major part of the total zinc extraction is performed in the first stage by molten zinc, the quantity of lead required for circulation in the second stage is much less than is required in the single-stage lead process of the aforementioned Patent No. 2,464,262, and the lead can be kept at a lower temperature. Full advantage can in fact be taken of the fact that lead has a lower melting point than zinc, so that the gases when finally discharged can have been scrubbed at a temperature below the melting point of zinc.

Scrubbing the gas with lead at a low temperature ensures that zinc vapour is almost completely removed from the gas. If, however, the lead leaves the condenser at a temperature below the melting point of zinc cooling this lead further brings the condensed zinc out of solution as crystals, which have to be remelted to produce liquid zinc. It is preferable that, on the one hand, the gas should be scrubbed by lead at a temperature below the melting point of zinc, while, on the other hand, the lead should leave the condenser at a temperature above the melting point of zinc.

To obtain the greatest benefit in this respect, the lead condensation may be performed in two stages, making, with the first stage of condensation by molten zinc, three stages in all. The two stage lead condensation is performed in the same way as the two-stage condensation by molten zinc already described, and by means of similar apparatus, that is, in two chambers in series each provided with mechanical shower producing means and counter-current flow of molten metal and gas, the latter passing from the first to the second of the two lead condensation chambers and the molten lead flowing from the second to the first lead condensation chamber.

Such a three-stage plant, using molten zinc and lead in series, is suitable for the treatment of gas from a blast furnace in which sintered zinc ore is reduced. In a typical plant of this kind the first condensing chamber, containing a device for producing a shower or spray of molten zinc, is situated as close as possible to the outlet by which the gases leave the furnace; rapid chilling is thereby effected, and any considerable amount of oxidation of zinc by carbon dioxide or other gases present is avoided. This first condenser chamber has a tap hole or other means through which liquid zinc can be run off; the heat insulation round this chamber is so adjusted that the molten zinc tapped has a temperature of, say, 550° C. From this first chamber the gases then pass in turn through two condenser-chambers, each fitted with apparatus for producing a shower or spray of molten lead, the last of these chambers having an opening in the roof for the stack by which the gases finally leave. Through these two latter chambers molten lead is circulated, in countercurrent with the gas stream; lead is introduced continuously into the chamber from which the gases finally leave by the stack, and flows over a weir into the adjacent chamber, whence it is allowed to flow out continuously. The lead, containing some zinc in solution, is cooled under controlled conditions to separate some of its dissolved zinc, and is then recirculated. The wall between the first chamber in which molten zinc is showered and the adjacent chamber in which molten lead is showered is of sufficient height to prevent flow of liquid metal from one compartment to the other, but there is sufficient free space above the top of the wall to permit free travel of gases.

The paddle-wheel referred to can have a variety of forms. It may consist of a drum with projecting paddles, which may be shrouded by end flanges. Alternatively it may have a saw-tooth profile. Furthermore, the depth of the projections, and the number of them disposed round the circumference, may be varied. In one case, which may be of importance, a notched, fluted or grooved roller is used; in this case there will be very numerous indentations or, alternatively regarded, very numerous teeth, all of small size.

The shower-producing device need not necessarily revolve round a horizontal axis. For instance, one type of device that may be used comprises a propeller, or series of cones or cups, or a centrifugal impeller, rotated by a vertical central shaft introduced through the roof of the chamber, an example of a device of this kind according to the invention being hereinafter described with reference to the drawings.

Another method, particularly convenient for the stage or stages of condensation for which lead is used, is to allow a stream of the molten metal to fall onto a table which is kept in rapid rotation by a vertical shaft.

The accompanying drawings illustrate schematically some typical embodiments of zinc condenser assemblies according to the invention, by way of example only and without implied limitation of the scope of the invention as defined in the appended claims.

The drawings also include figures illustrating typical examples of paddle-wheels and other molten metal-showering devices for use in condenser assemblies according to the invention.

In the drawings:

Figures 1–3 respectively are schematic central vertical sections of a first, a second and a third example of a condenser-assembly;

Figure 8 is a central vertical section of a centrifugal impeller device for showering molten metal, with vertical axis;

Figure 11 is a partial transverse section of the condenser-assembly shown in Figure 1 provided with a modified form of cooling device for the molten metal in the bottom of the condenser.

Figure 4:
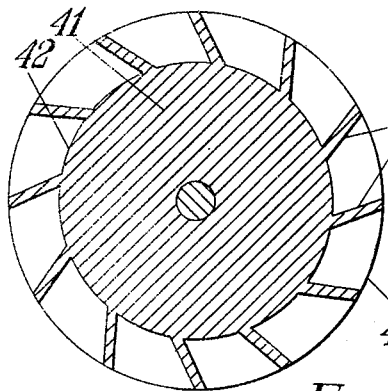
Figures 4 and 5 are respectively transverse sections of two alternative examples of paddle-wheel or rotor structure.

In Figure 1, showing a two-stage condenser; 1 represents a flue by which the zinc-bearing gases are conducted from the source, which may, for example, be a zinc blast furnace, to the condenser, which is divided into two compartments, 2 and 3. In compartment 2 is a rotary showering device or rotor 4 dipping into a pool of molten zinc 5. In compartment 3 is a similar rotary showering device or rotor 6 dipping into a pool of molten lead 7. The floor 8 of the condenser is constructed of, or lined with, suitable refractory material that is not attacked by liquid zinc or lead. The roofs 9 and 10 of the compartments are removable and are similarly constructed. Between the two compartments there is a baffle 11 depending from the roof; beneath it is a baffle 12 supported from the floor and of sufficinet height to prevent liquid zinc or lead flowing from one compartment to the other. Through the opening between these baffles the gas passes from compartment 2 to compartment 3. At the inlet end of compartment 2 is a depending baffle 13 which compels the incoming gas to pass through an opening 14 just above the level of the molten zinc. If the rotors 4, 6 rotate on horizontal axes as shown, the rotor 4 is rotated in a direction shown by an arrow such that the lower half is moving towards the opening 14, ensuring that the entering gases are immediately brought into contact with a spray of molten zinc; and the rotor 6 in compartment 3 rotates in the opposite direction (as shown by an arrow), so that its lower half is moving towards the gas outlet 15, which is limited at the top by a depending baffle 16. This arrangement ensures that the gases traverse, firstly a spray of molten zinc in compartment 2, and then a spray of molten lead in compartment 3.

The pool of liquid zinc 5 is connected with an outer well 17 by an underflow weir 18. From this well 17 the zinc is run off continuously or removed at frequent intervals, to maintain the desired level of zinc in compartment 2 and thus a suitable depth of immersion of the rotor 4. Should the temperature of the zinc in compartment 2 tend to become too high this can be corrected by effecting auxiliary cooling in the well 17, or by circulating cooling water in a jacket round the sump or base of the compartment 2. Should the temperature of the zinc become too low, this can be corrected by placing insulation bricks round compartment 2.

Lead is continuously circulated through compartment 3, entering by pipe 20 and leaving by pipe 19; it takes some zinc into solution and rises in temperature during its passage. It is then cooled under controlled conditions to separate some of its dissolved zinc and is returned through the pipe 20.

On the roof 10 of chamber 3 are placed insulating bricks 84 in order to reduce the heat loss from this chamber. In the outer well 17 is placed an immersion water cooler 85; water circulates through this, entering by pipe 86 and leaving by pipe 87. This water-immersion cooler is removable. For varying the amount of heat thus abstracted a series of such coolers of different total cooling length may be kept available.

In Figure 11 there is shown a water-immersion cooler 88 which is introduced through well 17 but protrudes beneath the baffle 18 and thereby is able to directly cool the pool of liquid zinc 5 in chamber 2.

Figure 2 shows a two-stage condenser arrangement using molten zinc in both stages. The only difference from Figure 1 is that the baffle 11a (corresponding to baffle 11 of Figure 1) extends rather further down, and the baffle 12a (corresponding to baffle 12 of Figure 1) is lower and constitutes an overflow weir, over which molten zinc flows from compartment 3 to compartment 2. The outflow and inflow pipes 19, 20 of Figure 1, are omitted from Figure 2. Means of the kind mentioned above, i. e. water cooling of the sump and the use of insulating bricks may be used to regulate the temperature of compartment 3 to a value lower than that of the temperature of compartment 2, and preferably only slightly above the melting point of zinc (420° C.). The sump of compartment 3 is initially filled with molten zinc up to the level of the weir 12a and as zinc condenses in compartment 3 the molten zinc overflows the weir into compartment 2 and is withdrawn through well 17 as in the arrangement of Figure 1.

In Figure 3, the first condensing chamber 21 contains a rotor 22 which rotates and dips into a pool 23 of molten zinc, producing a shower of molten zinc. This effects rapid chilling of the zinc-bearing gases entering from a flue 24 beneath a baffle 25 to be brought into contact with the shower of molten zinc. The zinc condensed can be run off under a baffle 26 to an outside well 27, whence it can be removed by any convenient means; alternatively, the zinc can be run off directly from a tap-hole (not shown) arranged in chamber 21. The temperature of the molten zinc is maintained at about 550° C. If it becomes too cold, insulating bricks may be placed round chamber 21. If the zinc becomes too hot, cooling may conveniently be effected by an immersion water-cooler in well 27. Alternatively, cooling may be effected by a water-jacket round the sides and bottom of the sump.

From the zinc spraying condenser 21 the gases then pass successively through a condenser chamber 28 provided with a rotor 30 and a condenser chamber 29 provided with a rotor 31 for producing showers of molten lead. From chamber 29 the gases leave by a flue 32. While the opening to flue 32 may be situated directly in the roof of chamber 29, it is preferable to provide a baffle 33 below which the gas must pass thus compelling it to enter the flue near the bottom of chamber 29. Molten lead, is introduced into chamber 29 by pipe 34 and forms a pool 35 into which the rotor 31 dips. The lead then flows over a weir 36 into chamber 28, where it forms a pool 37, into which rotor 30 dips. Thence the lead flows out continuously through pipe 38. The lead, containing some zinc in solution, is cooled under controlled conditions to separate some of its dissolved zinc and is then recirculated back by pipe 34. If the rotors rotate on horizontal axes as shown, their directions of rotation are as indicated by the arrows in the figure.

Between chamber 21 in which molten zinc is showered and the adjacent chamber 28 in which molten lead is showered is a wall 39 of sufficient height to prevent flow of liquid metal from one chamber to the other. The space above this wall 39 up to the roof may be left open, but it is found preferable to hang a baffle 40 from the roof to prevent spray being thrown from one chamber to the other. There is sufficient space between baffles 39 and 40 to permit free flow of gas from chamber 21 to chamber 28. A depending baffle 41 is also interposed between chambers 28 and 29.

Some typical examples of paddle-wheels and other rotary devices for showering molten metal for use in condensers according to this invention will now be briefly described.

In Figure 4, 41 is a paddle-wheel comprising a metal drum 42, with projecting paddles 43, which may be shrouded by end flanges 44. This is suitable only for use in lead.

Figure 5:
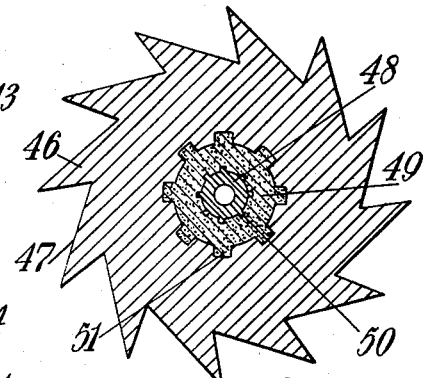

In Figure 5 is shown a rotor 46 with a sawtooth profile 47. This may be constructed of graphite and carried by a water-cooled metal shaft 48 which extends through the side walls of the condenser. Separating the hollow shaft 48 from direct contact with the graphite is a sleeve 49 of insulating cement, embedded in which are several ribs 50 projecting from the shaft 48. Similarly, the cement is keyed to the graphite by providing recesses 51 in the graphite which are filled with cement.

Figure 6:
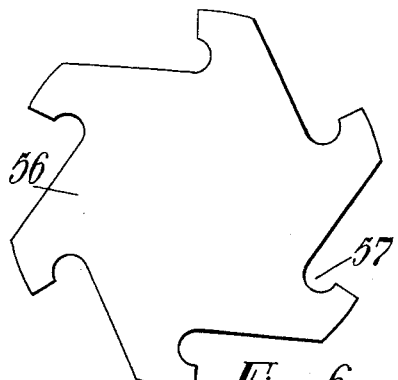
Figures 6 and 7 show two further examples of paddle-wheel or rotor structure in transverse section (outline only)

Figure 6 shows the profile of a rotor 56 constructed of graphite, so shaped as to provide cups 57 which serve to pick up the molten metal into which it dips.

Figure 7:
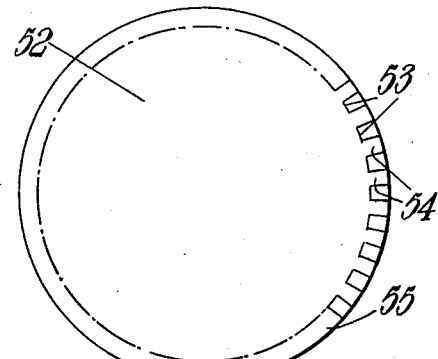

Figure 7 shows the profile of a graphite rotor 52, notched with numerous indentations 53, or, alternatively regarded, provided with numerous teeth 54. This is shrouded by end flanges 55, also consisting of graphite.

Figure 9:
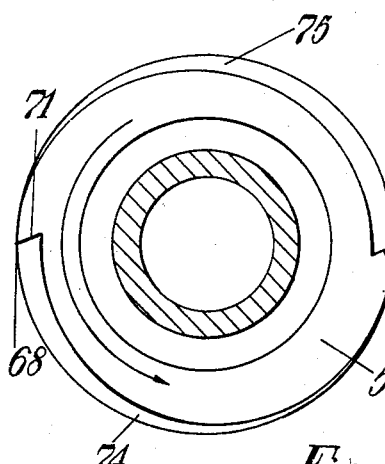
Figure 9 is a transverse section on the line 9—9 of Figures 8 and 10.
Figure 10:
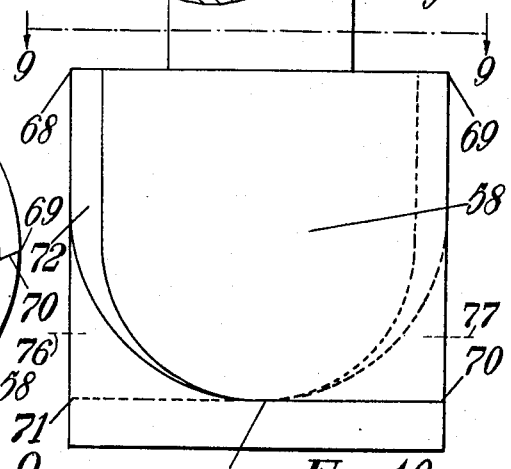
Figure 10 is a view in elevation of the impeller itself of Figures 8 and 9.

Figures 8 to 10 show a centrifugal impeller device which comprises a generally cylindrical rotor 58 which is carried by a hollow metal shaft 59, vertically mounted and extended through the roof 60 of the condensing chamber. The rotor 58 may be constructed of graphite or other suitable refractory material and is separated from direct contact with the shaft 59 by a sleeve 61 of insulating cement. Of one piece with the rotor is an upwardly extending hollow cylinder 62 of graphite which surrounds the shaft 59, with a layer of insulating cement in between, up to the roof 60 of the condensing chamber. At its lower end the shaft 59 is furnished with splines 63 so as to key it to the insulating cement. In the same region there are recesses 64 in the rotor and these are filled with cement, so that the shaft, sleeve and rotor are effectively keyed together. The shaft 59 is cooled by water or other fluid cooling medium introduced through a pipe 65 which terminates just above the bottom of the hollow shaft 59. Leaving the open end 66 of this pipe, the fluid flows upwards through the annulus 67 between the pipe 64 and the shaft 59.

On the outside surfaces of the rotor are two similar and diametrically opposite ledges cut out of the cylindrical surface, each, as shown by Figures 9 and 10, extending from a point 68 or 69 at the top of the rotor to a diametrically opposite point 70 or 71 respectively at the bottom of the rotor. The path followed on the cylindrical surface of the rotor may be described by considering this surface as unrolled onto a plane; the ledge from 68 to 70 would then be vertical from 68 to 72, approximately circular, forming a quadrant of a circle from 72 to 73, and horizontal from 73 to 70. The ledges are recessed into the surface, being cut at a somewhat acute angle.

In horizontal projection the ledges taper from a maximum depth at 68 (69) through a mean depth at 74 (75) to zero depth at 70 (71). The direction of rotation is shown by an arrow in Figure 9.

The bottom of the rotor is situated at a level below that of the surface of the molten metal in the condensing chamber and the upper end of the body of the rotor is above the surface level of the molten metal. A convenient level for the molten metal is shown by the line 76—77.

The rotating sleeve 62, fits with only a narrow clearance, inside a stationary sleeve 78 extending downwards from the roof 60 of the condenser and into a circular trough 79 cut into the top of the rotor. This trough is filled with liquid metal, which forms an effective seal. The upper end of the stationary sleeve 78 is enclosed in a gas seal, comprising a tight fitting box 80 with an opening in the top through which the shaft 59 extends, this being fitted with a bush 82. In the side of the box 80 there is an opening 83 through which a slow stream of gas is pumped; a suitable gas for this purpose is one consisting chiefly of carbon monoxide, such as the condenser gas after zinc has been removed from it. This gas passes down the annulus between the stationary sleeve 78 and the rotating sleeve 62, becoming heated as it does so, and then bubbles through the liquid metal contained in the circular trough 79.

It is to be understood that the rotary devices for showering molten metal of the condensing plants illustrated in Figures 1 to 3 may be of the vertical-axis type as illustrated in Figures 8 to 10, or of the horizontal axis paddle-wheel type. It is merely for convenience that they have been schematically represented as horizontal-axis rotors.

I claim:

1. In a zinc condenser having walls which define a condensing chamber, at least one substantially vertical interior partition dividing the condensing chamber into a plurality of condenser compartments and thus minimizing heat transfer from one compartment to another, a bath of molten metal in the bottom portion of each condenser compartment, the walls being provided with a gas inlet opening communicating with a first condenser compartment and a gas outlet opening communicating with a last condenser compartment, each of the interior partitions being provided with a gas transfer opening communicating with adjacent condenser compartments above the baths of molten metal, metal showering means within each condenser compartment adapted to hurl molten metal from the bath against the walls of each compartment, and means for introducing molten metal into each condenser compartment and means for removing molten metal therefrom, a combination therewith of temperature control means for cooling the bath of molten metal in the first condenser compartment, and heat insulating means for preventing excessive cooling of the last condenser compartment so as to maintain the molten metal in the first compartment at a higher temperature than the bath of molten metal in the last condenser compartment without lowering below its melting point the zinc which is removed from the condenser with the metal of the last condenser compartment.

2. Apparatus according to claim 1, characterized in that at least one of said vertical interior partitions comprises a lower wall portion the upper edge of which terminates above the level of the molten metal baths in the adjacent condenser compartments and an upper wall portion depending from the roof of the condenser the lower edge of which terminates an appreciable distance above the upper edge of said lower wall portion whereby the flow of molten metal from one condenser compartment to the adjacent compartment is prevented and the free transfer of gases between said compartments is permitted.

STANLEY ROBSON.

References Cited in the file of this patent

UNITED STATES PATENTS

| Number | Name | Date |
|---|---|---|
| 2,122,334 | Asbury | June 8, 1938 |
| 2,238,819 | Neve | Apr. 15, 1941 |
| 2,348,194 | Crane et al. | May 9, 1944 |
| 2,457,545 | Handwerk et al. | Dec. 28, 1948 |
| 2,457,552 | Handwerk et al. | Dec. 28, 1948 |

FOREIGN PATENTS

| Number | Country | Date |
|---|---|---|
| 99,328 | Switzerland | June 16, 1923 |
| 55,473 | Sweden | Oct. 30, 1923 |
| 572,961 | Great Britain | Oct. 31, 1945 |